(No Model.)
J. B. MASSEY.
WIRE STRETCHER AND SPLICER.
No. 560,731. Patented May 26, 1896.
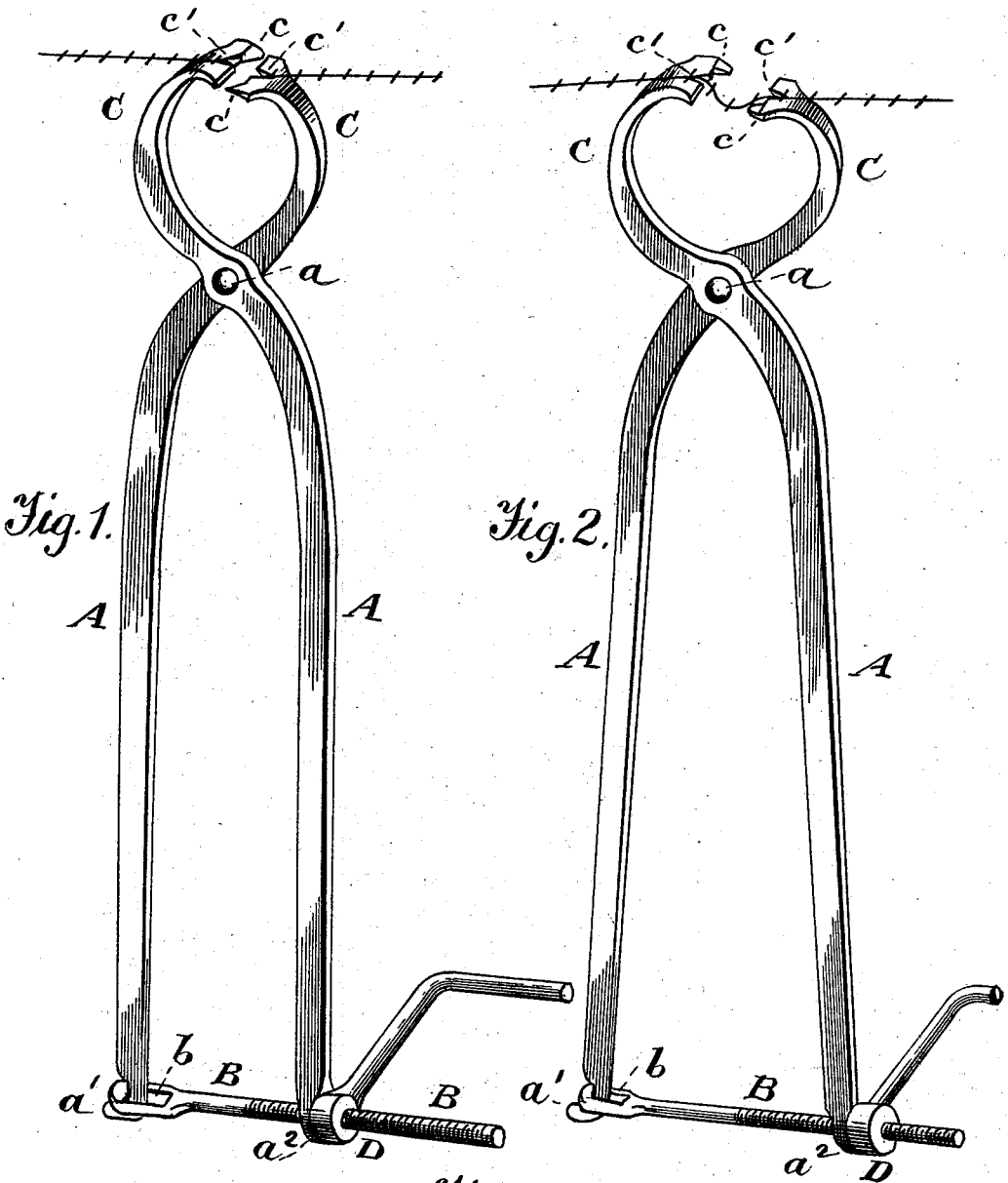

UNITED STATES PATENT OFFICE.

JOSEPH BORYGARD MASSEY, OF LLANO, TEXAS.

WIRE STRETCHER AND SPLICER.

SPECIFICATION forming part of Letters Patent No. 560,731, dated May 26, 1896.

Application filed November 6, 1895. Serial No. 568,081. (No model.)

*To all whom it may concern:*

Be it known that I, JOSEPH BORYGARD MASSEY, a citizen of the United States, residing at Llano, in the county of Llano and State of Texas, have invented certain new and useful Improvements in Wire Stretchers and Splicers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a wire-patcher by which the wire rails of fences may be spliced when broken and stretched when any slack occurs. The tool which I employ will stretch wire one or two hundred yards by simply pulling around a post.

Figure 1 of the drawings is an elevation showing how the two ends of a broken wire are spliced; Fig. 2, a similar elevation showing how a slack wire is stretched, and Fig. 3 a front view of the jaws of my patcher.

In the drawings, A represents two levers correspondingly shaped, pivoted at $a$, where they intersect, provided with clamping-jaws C C at one end, and having the hook $a'$ and eye $a''$ at the other end, the hook and eye being arranged in planes at right angles to each other. Through the eye $a^2$ passes a bolt B, threaded at one end and provided with a handled nut D. At the other end of the bolt is formed a flat head with the slot $b$ to engage the hook $a'$.

The clamping-jaws C C have each an end projection $c$, but they are diagonally opposite to each other; also, a wedge-groove $c'$; but the two grooves are not opposite to each other, so as to register when the jaws are clamped together. These grooves are cut deeper toward the outside, as shown in Fig. 3 of the drawings. The jaws grasp the broken ends of the wire, as shown in Fig. 1 of the drawings, and the wire at two points, as shown in Fig. 2 of the drawings, and are then brought together by turning the handled nut on the thread of the screw.

I have found this to be a very useful and labor-saving tool on a farm in wire-fencing, being so conveniently portable and adapted to be so easily used without any assistance.

What I claim as new, and desire to protect by Letters Patent, is—

A wire-stretcher having jaws with the diagonally opposite end projections $c\ c$ and, between said projections, the wedge-grooves $c'\ c'$ to hold the ends of wire while they are being drawn together, the said grooves not being opposite to each other but arranged as shown and described.

In testimony whereof I affix my signature in presence of two witnesses.

JOSEPH BORYGARD MASSEY.

Witnesses:
H. R. McINNIS,
T. G. HILL.